(12) United States Patent
Park et al.

(10) Patent No.: US 11,181,152 B2
(45) Date of Patent: Nov. 23, 2021

(54) CONE CLUTCH FOR VEHICLE

(71) Applicants: Hyundai Motor Company, Seoul (KR); Kia Motors Corporation, Seoul (KR)

(72) Inventors: Jong Yun Park, Hwaseong-Si (KR); Sung Wha Hong, Hwaseong-Si (KR); Dong Woo Gwak, Hwaseong-Si (KR); Seong Eun Yun, Bucheon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 16/787,732

(22) Filed: Feb. 11, 2020

(65) Prior Publication Data
US 2021/0079960 A1   Mar. 18, 2021

(30) Foreign Application Priority Data

Sep. 16, 2019   (KR) .................. 10-2019-0113281

(51) Int. Cl.
| *F16D 13/32* | (2006.01) |
| *F16D 13/72* | (2006.01) |
| *F16D 13/74* | (2006.01) |
| *F16D 23/06* | (2006.01) |

(52) U.S. Cl.
CPC .......... *F16D 13/32* (2013.01); *F16D 13/72* (2013.01); *F16D 13/74* (2013.01); *F16D 2023/0681* (2013.01); *F16D 2300/06* (2013.01)

(58) Field of Classification Search
CPC .......... F16D 13/32; F16D 13/72; F16D 13/74; F16D 2300/06; F16D 13/683; F16D 13/06; F16D 2013/642; F16D 2023/068; F16D 13/66
See application file for complete search history.

(56) References Cited

U.S. PATENT DOCUMENTS

| 2018/0112720 A1* | 4/2018 | Choi ................. F16D 13/32 |
| 2018/0142739 A1* | 5/2018 | Park ................. F16D 23/04 |

FOREIGN PATENT DOCUMENTS

| FR | 2922976 | * | 1/2009 |
| JP | 2000-145931 | * | 5/2000 |
| KR | 10-2018-0058907 A |  | 6/2018 |

OTHER PUBLICATIONS

Machine language translation of FR2922976.*

* cited by examiner

*Primary Examiner* — Mark A Manley
(74) *Attorney, Agent, or Firm* — Morgan, Lewis & Bockius LLP

(57) ABSTRACT

A cone clutch for a vehicle may include a hub, a sleeve, a clutch ring including a clutch cone, a first friction ring, an internal middle cone, a second friction ring, an external middle cone, and a third friction ring, wherein friction members are provided on only any one of two contact surfaces between the clutch cone and the first friction ring, between the first friction ring and the internal middle cone, between the internal middle cone and the second friction ring, between the second friction ring and the external middle cone, and between the external middle cone and the third friction ring.

9 Claims, 11 Drawing Sheets

CONE CLUTCH FOR VEHICLE

CROSS REFERENCE TO RELATED APPLICATION

The present application claims priority to Korean Patent Application No. 10-2019-0113281, filed Sep. 16, 2019, the entire contents of which is incorporated herein for all purposes by this reference.

BACKGROUND OF THE INVENTION

Field of the Invention

The present invention relates to a clutch for a vehicle, and more particularly, to a structure of a clutch which may be used for a transmission.

Description of Related Art

A plurality of clutches are used in a transmission or the like of a vehicle to intermit power transfer between rotating bodies rotating relative to each other The clutch as described above has a large torque transfer capacity while occupying as small a volume as possible, but generally, to secure a large torque transfer capacity, a volume of the clutch tends to be increased.

Meanwhile, to increase a torque transfer capacity of the clutch, a friction area that generates a frictional force needs to be increased, and in a structure of increasing the friction area using a plurality of components, heat generated in the components forming the friction area needs to be effectively dispersed and discharged to secure stable durability of the clutch.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cone clutch for a vehicle which is configured for implementing a relatively large torque transfer capacity while having a simple and compact configuration and occupying a relatively small volume, is configured for reducing drags by allowing a frictional force not to be generated on friction surfaces as much as possible in a release state in which power is not transferred, and is configured for improving durability and ultimately contributing to improvement of fuel efficiency by allowing components contributing to formation of the frictional force to be effectively cooled.

According to an exemplary embodiment of the present invention, a cone clutch for a vehicle, includes: a hub mounted so that movement thereof in an axial direction and rotation thereof are restricted to a shaft; a sleeve mounted so that a rotation of the sleeve is restricted to an external side of the hub and movement of the sleeve in the axial direction is possible; a clutch ring mounted so that movement of the clutch ring in the axial direction is restricted and rotation of the clutch ring is allowed with respect to the shaft and integrally including a clutch cone protruding toward the hub and having a gradually reduced external diameter; a first friction ring provided between the clutch ring and the hub, mounted so that a rotation thereof is restricted with respect to the hub, and pressed toward the clutch ring along the axial direction thereof to allow a frictional force to be applied between the first friction ring and the clutch cone; an internal middle cone mounted so that a rotation of the internal middle cone is restricted with respect to the clutch ring and having an internal side surface in contact with an external side surface of the first friction ring; a second friction ring mounted so that a rotation of the second friction ring is restricted with respect to the hub and having an internal side surface in contact with an external side surface of the internal middle cone; an external middle cone mounted so that a rotation of the external middle cone is restricted with respect to the clutch ring and having an internal side surface in contact with an external side surface of the second friction ring; and a third friction ring mounted so that a rotation of the third friction ring is restricted with respect to the hub and having an internal side surface in contact with an external side surface of the external middle cone when the third friction ring is pressed by the sleeve, wherein friction members are provided on only any one of two contact surfaces between the clutch cone and the first friction ring, between the first friction ring and the internal middle cone, between the internal middle cone and the second friction ring, between the second friction ring and the external middle cone, and between the external middle cone and the third friction ring.

The friction member may be provided on at least one of an internal contact surface or an external contact surface of each of the first friction ring, the internal middle cone, the second friction ring, and the external middle cone.

The first friction ring may include the friction members provided on both of an internal contact surface and an external contact surface thereof.

The internal middle cone may include the friction members provided on both of an internal contact surface and an external contact surface thereof.

The second friction ring may include the friction members provided on both of an internal contact surface and an external contact surface thereof.

The external middle cone may include the friction members provided on both of an internal contact surface and an external contact surface thereof.

The friction member may be provided on an external contact surface of the clutch cone.

The friction member may be provided on an internal contact surface of the third friction ring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
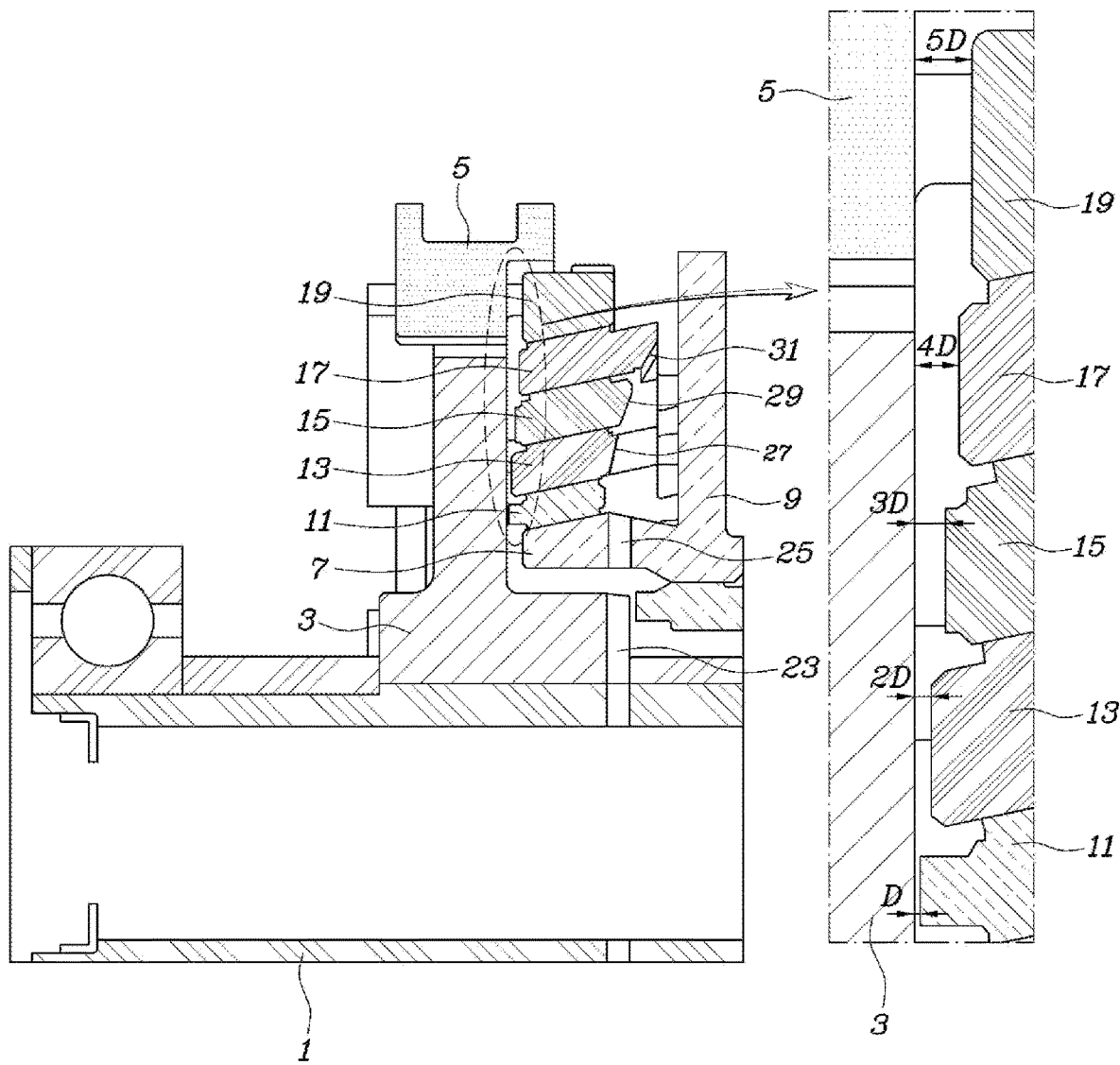
FIG. 1 is a cross-sectional view of a cone clutch for a vehicle according to an exemplary embodiment of the present invention along a shaft direction thereof.
Figure 2:
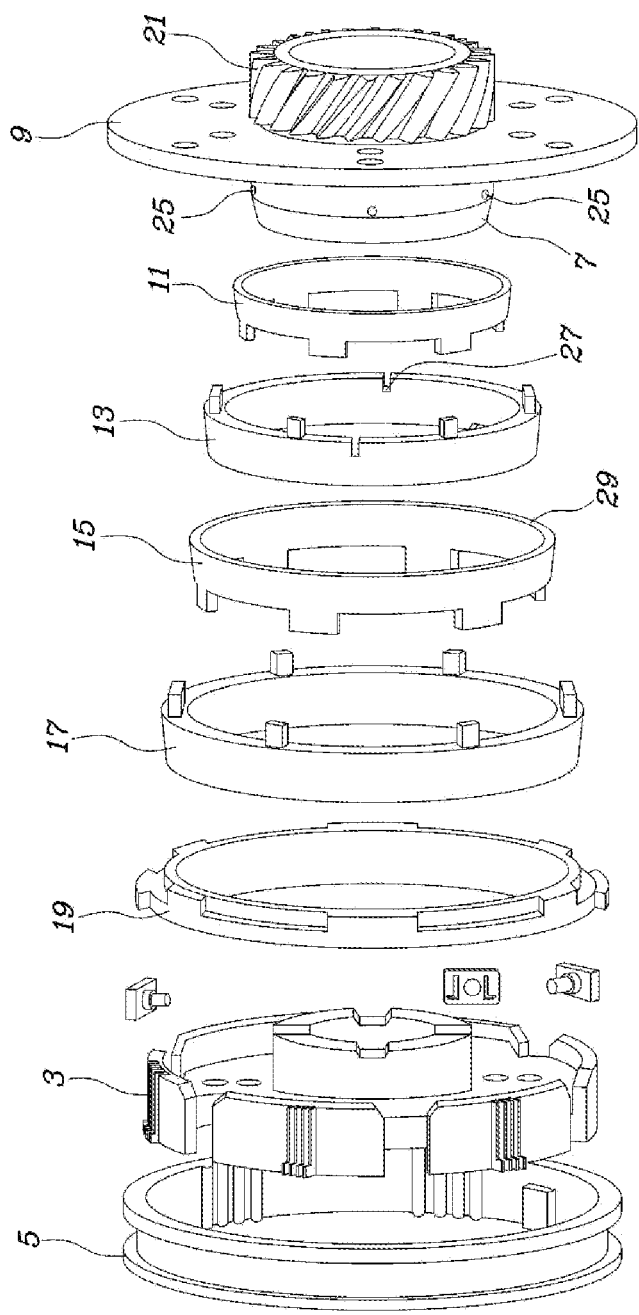
FIG. 2 is an exploded perspective view of the cone clutch of FIG. 1.
Figure 3:
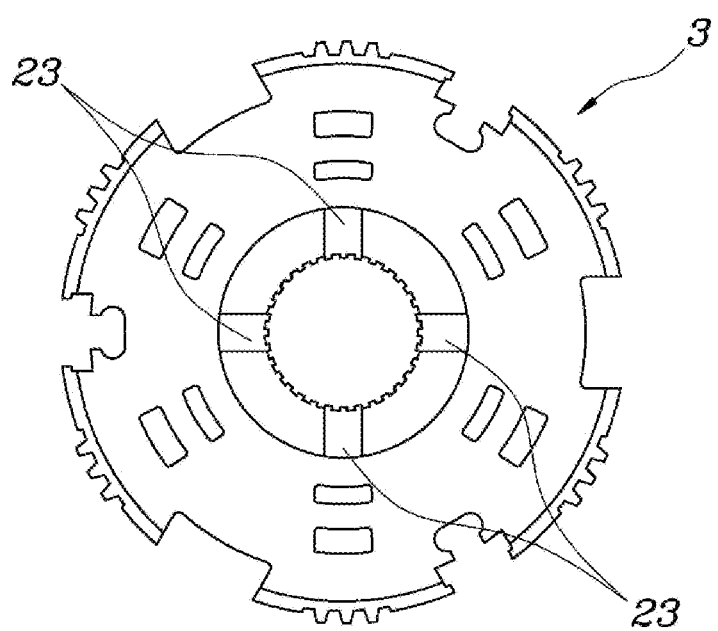
FIG. 3 is a view exemplarily illustrating a hub of FIG. 2.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Referring to FIG. 1, FIG. 2, FIG. 3, FIG. 4, and FIG. 5, a cone clutch for a vehicle according to an exemplary embodiment of the present invention is configured to include a hub 3 mounted so that movement thereof in an axial direction and rotation thereof are restricted to a shaft 1; a sleeve 5 mounted so that a rotation thereof is restricted to an external side of the hub 3 and movement thereof in the axial direction is possible; a clutch ring 9 mounted so that movement thereof in the axial direction is restricted and rotation thereof is possible with respect to the shaft 1 and integrally including a clutch cone 7 protruding toward the hub 3 and having a gradually reduced external diameter; a first friction ring 11 provided between the clutch ring 9 and the hub 3, mounted so that a rotation thereof is restricted with respect to the hub 3, and pressed toward the clutch ring 9 along the axial direction thereof to allow a frictional force to be applied between the first friction ring 11 and the clutch cone 7; an internal middle cone 13 mounted so that a rotation thereof is restricted with respect to the clutch ring 9 and having an internal side surface in contact with an external side surface of the first friction ring 11; a second friction ring 15 mounted so that a rotation thereof is restricted with respect to the hub 3 and having an internal side surface in contact with an external side surface of the internal middle cone 13; an external middle cone 17 mounted so that a rotation thereof is restricted with respect to the clutch ring 9 and having an internal side surface in contact with an external side surface of the second friction ring 15; and a third friction ring 19 mounted so that a rotation thereof is restricted with respect to the hub 3 and having an internal side surface in contact with an external side surface of the external middle cone 17 when the third friction ring is pressed by the sleeve 5.

That is, in a state in which the hub 3 is mounted so that both of the movement thereof in the axial direction and the rotation thereof are restricted onto the shaft 1 and the clutch ring 9 is mounted so that the movement thereof in the axial direction is restricted and the rotation thereof is possible, the cone clutch according to an exemplary embodiment of the present invention is configured to switch between a state in which a torque is transferred between the hub 3 and the clutch ring 9 and a release state in which the torque is not transferred between the hub 3 and the clutch ring 9, and a gear or the like is connected integrally with the clutch ring 9, such that the cone clutch according to an exemplary embodiment of the present invention is ultimately configured to intermit power between the shaft 1 and the gear.

For reference, a gear 21 is coupled integrally with the clutch ring 9.

Here, the cone clutch according to an exemplary embodiment of the present invention may continuously change the transferred torque by continuously varying a frictional force between the hub 3 and the clutch ring 9, and does not transfer a torque by gears by engaged with each other as in a synchromesh device according to the related art.

Figure 4:
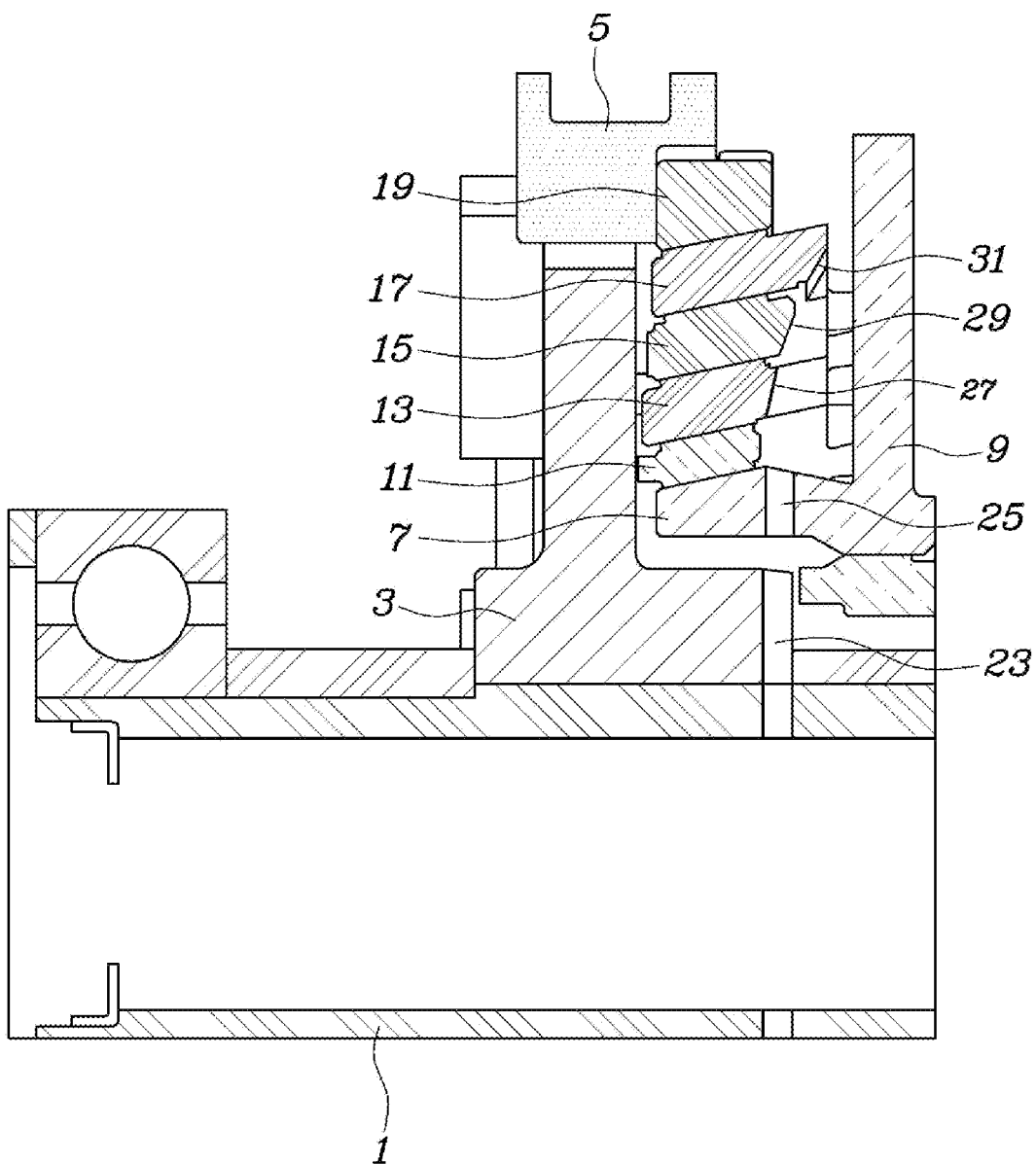
FIG. 4 is a view illustrated in comparison with FIG. 1 and illustrating an operation state in which a torque is transferred.
Figure 5:
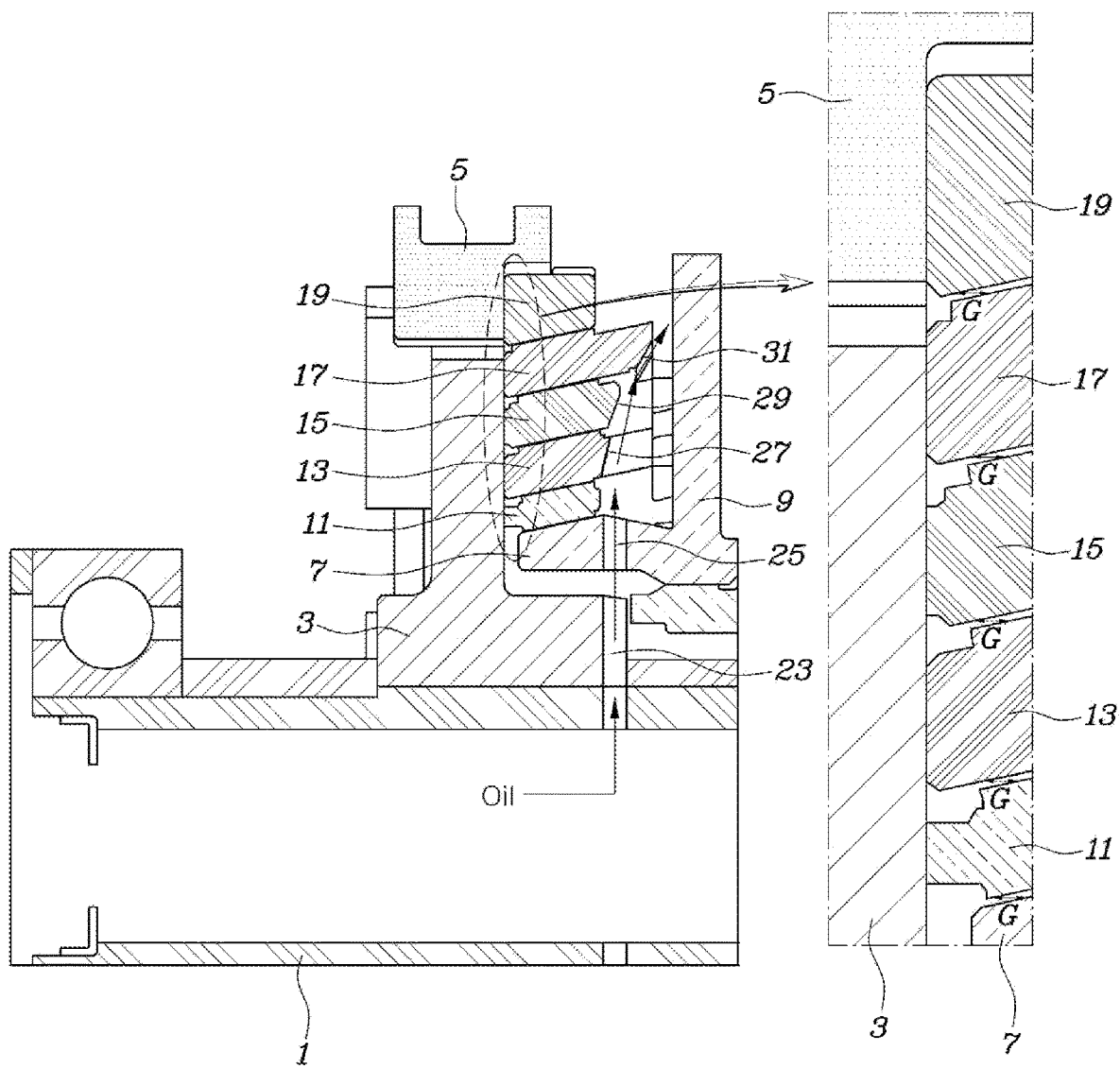
FIG. 5 is a view illustrated in comparison with FIG. 1 and illustrating a release state in which a torque is not transferred.

For reference, the axial direction refers to a longitudinal direction of the shaft 1, and a radial direction refers to a radial direction of the shaft 1. In an operation state as illustrated in FIG. 4, the first friction ring 11, the second friction ring 15, and the third friction ring 19 rotating together with the hub 3 form a frictional force while being in close contact with the internal middle cone 13 and the external middle cone 17 rotating together with the clutch ring 9 to allow power to be transferred between the hub 3 and the clutch ring 9. In a release state as illustrated in FIG. 5, the first friction ring 11, the second friction ring 15, and the third friction ring 19 rotate together with the hub 3, and the internal middle cone 13 and the external middle cone 17 may have a speed different from that of the hub 3, together with the clutch ring 9.

Here, as illustrated in FIG. 4, in a state in which the third friction ring 19 is pressed by the sleeve 5, such that all of the third friction ring 19, the external middle cone 17, the second friction ring 15, the internal middle cone 13, the first friction ring 11, and the clutch cone 7 are in close contact with each other, distances by which these components are spaced from the hub 3 in the axial direction are configured to be gradually increased in a sequence of the first friction ring 11, the internal middle cone 13, the second friction ring 15, the external middle cone 17, and the third friction ring 19, as illustrated in FIG. 1.

For reference, FIG. 4 illustrates an operation state in which the sleeve 5 actually presses the third friction ring 19 to allow the torque to be transferred between the hub 3 and the clutch ring 9, and FIG. 1 illustrates a state in which only the sleeve 5 retreats to a neutral state from the state as illustrated in FIG. 4, to compare a distance by which the third friction ring 19 is spaced from the hub 3 in the axial direction with distances by which the other components are spaced from the hub 3.

That is, in the state in which the third friction ring 19 is pressed by the sleeve 5, such that all of the third friction ring 19, the external middle cone 17, the second friction ring 15, the internal middle cone 13, the first friction ring 11, and the clutch cone 7 are maximally moved toward the clutch ring 9 to be sequentially in close contact with each other, distances by which the components described above are spaced from the hub 3 are configured to be gradually increased in a sequence of the first friction ring 11, the internal middle cone 13, the second friction ring 15, the external middle cone 17, and the third friction ring 19.

As described above, when the distances by which the components described above are spaced from the hub 3 are configured to be increased toward the radial direction on the basis of the shaft 1 in the state in which all of the components described above (the first friction ring 11, the internal middle cone 13, the second friction ring 15, the external middle cone 17, and the third friction ring 19) are in close contact with each other toward the clutch ring 9, as illustrated in FIG. 5, in the state in which all of the components described above are in close contact with each other toward the hub 3, gaps G are naturally formed between the respective components due to a structural feature.

When the gaps G are formed between the components as described above, frictional forces are hardly generated between the respective components, such that drags may be significantly reduced.

The state as illustrated in FIG. 5 is the release state in which the cone clutch according to an exemplary embodiment of the present invention does not transfer the power, and a state in which the drags are hardly generated between the respective components is formed to minimize unnecessary power consumption at the time of driving the vehicle, such that fuel efficiency of the vehicle may be ultimately improved.

For reference, in an operation state as illustrated in FIG. 4, the first friction ring 11, the second friction ring 15, and the third friction ring 19 rotating together with the hub 3 forms a frictional force while being in close contact with the internal middle cone 13 and the external middle cone 17 rotating together with the clutch ring 9 to allow power to be transferred between the hub 3 and the clutch ring 9. In a release state as illustrated in FIG. 5, the first friction ring 11, the second friction ring 15, and the third friction ring 19 rotate together with the hub 3, and the internal middle cone 13 and the external middle cone 17 may have a speed different from that of the hub 3, together with the clutch ring 9.

In an exemplary embodiment of the present invention, the distances by which the first friction ring 11, the internal middle cone 13, the second friction ring 15, the external middle cone 17, and the third friction ring 19 are spaced from the hub 3 in the axial direction are configured to be sequentially increased as multiples of a distance D by which the first friction ring 11 is spaced from the hub 3.

Therefore, when all of the components described above are in close contact with each other toward the hub 3, as illustrated in FIG. 5, all constant intervals are formed between the components, which prevents a gap G formed between any specific components from being relatively small or relatively large to prevent occurrence of an increase phenomenon or the like of a local drag.

Meanwhile, in the cone clutch according to the exemplary embodiment of the present invention, a surface of the hub 3 facing the first friction ring 11, the internal middle cone 13, the second friction ring 15, the external middle cone 17, and the third friction ring 19 forms a plane perpendicular to the shaft 1.

Furthermore, hub passages 23 are formed in the hub 3 so that oil transferred through an internal portion of the shaft 1 passes along a radial direction of the hub 3, and clutch passages 25 are formed in the clutch ring 9 so that the oil is supplied through the hub passages 23 along a radial direction of the clutch ring 9, one side portion of the first friction ring 11 is positioned adjacent to the hub 3 on the basis of the center portion of the clutch ring passages 25, a first inclined surface 27 pressed toward the hub 3 by the oil from the clutch ring passages 25 in the radial direction of the shaft 1 is formed on one side portion of the internal middle cone 13, a second inclined surface 29 pressed toward the hub 3 by the oil passing through the first inclined surface 27 is formed on one side portion of the second friction ring 15, and a third inclined surface 31 pressed toward the hub 3 by the oil passing through the second inclined surface 29 is formed on one side portion of the external middle cone 17.

Therefore, a force for moving the components toward the hub 3 by a flow of the oil advancing in the radial direction of the shaft 1 through the hub passages 23 and the clutch ring passages 25 is applied to the components.

That is, in a state in which the third friction ring 19 is not pressed toward the clutch ring 9 by the sleeve 5, a state in which the components are basically pressed toward the hub 3 by the flow of the oil is formed.

Therefore, when the sleeve 5 is in the neutral state as illustrated in FIG. 1, the components are naturally pressed toward the hub 3 by the flow of the oil to form the release state as illustrated in FIG. 5, such that a state in which the drags are minimized is formed.

One side portion of the first friction ring 11 is positioned adjacent to the hub 3 on the basis of the center portion of the clutch ring passages 25, and the first friction ring 11 is thus pressed by the oil passing through the hub passages 23 and the clutch ring passages 25 and then discharged in the radial direction thereof. Therefore, the first friction ring 11 is pressed toward the hub 3.

Meanwhile, the second inclined surface 29 of the second friction ring 15 is formed so that the angle formed by the second inclined surface 29 with respect to the shaft 1 is smaller than the angle formed by the first inclined surface 27 of the internal middle cone 13 with respect to the shaft 1, and the third inclined surface 31 of the external middle cone 17 is formed so that the angle formed by the third inclined surface 31 with respect to the shaft 1 is smaller than the angle formed by the second inclined surface 29 of the second friction ring 15 with respect to the shaft 1, such that the oil discharged through the hub passages 23 and the clutch ring passages 25 may sequentially apply a pressure to the first inclined surface 27, the second inclined surface 29, and the third inclined surface 31 while advancing in the radial direction thereof.

As described above, in an exemplary embodiment of the present invention, due to a structural feature that the first friction ring 11, the internal middle cone 13, the second friction ring 15, the external middle cone 17, and the third friction ring 19 form together with the hub 3 and the clutch ring 9, in the operation state in which the power is transferred between the hub 3 and the clutch ring 9, relatively wide friction surfaces are formed within a relatively small volume to provide a larger torque transfer capacity, and in the release state in which the power is not transferred, the gaps G between the respective components used to form the friction surfaces may be naturally secured to minimize the drags, which may contribute to improvement of fuel efficiency of the vehicle.

Referring to FIG. 6, FIG. 7, FIG. 8, FIG. 9, FIG. 10, and FIG. 11, the cone clutch according to an exemplary embodiment of the present invention as described above has a configuration in which friction members F are provided on only any one of two contact surfaces between the clutch cone 7 and the first friction ring 11, between the first friction ring 11 and the internal middle cone 13, between the internal middle cone 13 and the second friction ring 15, between the second friction ring 15 and the external middle cone 17, and between the external middle cone 17 and the third friction ring 19.

That is, in the cone clutch according to an exemplary embodiment of the present invention, a frictional force is formed on a total of five friction portions sequentially formed by the clutch cone 7, the first friction ring 11, the internal middle cone 13, the second friction ring 15, the external middle cone 17, and the third friction ring 19 between the hub 3 and the clutch ring 9 to transfer a torque between the hub 3 and the clutch ring 9, and only one friction member F is provided on each of the five friction portions.

Since each of the five friction portions is formed by two contact surfaces of components adjacent to each other, and the friction member F is provided on only one of two contact surfaces adjacent to each other.

The friction member F includes a material different from that of the clutch cone 7, the first friction ring 11, the internal middle cone 13, the second friction ring 15, the external middle cone 17, and the third friction ring 19 formed of a metal material and has a thermal conductivity lower than those of the clutch cone 7, the first friction ring 11, the internal middle cone 13, the second friction ring 15, the external middle cone 17, and the third friction ring 19, and since friction on the friction portions is generated between the friction members F and components facing the friction members F, heat generated in the friction portions is transferred to components that do not include the friction members F and surface the friction members F, such that the heat flows along directions as illustrated by arrows in FIG. 6, FIG. 7, FIG. 8, FIG. 9, FIG. 10, and FIG. 11.

The friction member F is provided on at least one of an internal contact surface or an external contact surface of each of the first friction ring 11, the internal middle cone 13, the second friction ring 15, and the external middle cone 17.

That is, at least one friction member F is provided on each of components other than the clutch cone 7 and the third friction ring 19 mounted at the outermost portions among the clutch cone 7, the first friction ring 11, the internal middle cone 13, the second friction ring 15, the external middle cone 17, and the third friction ring 19.

Figure 10:
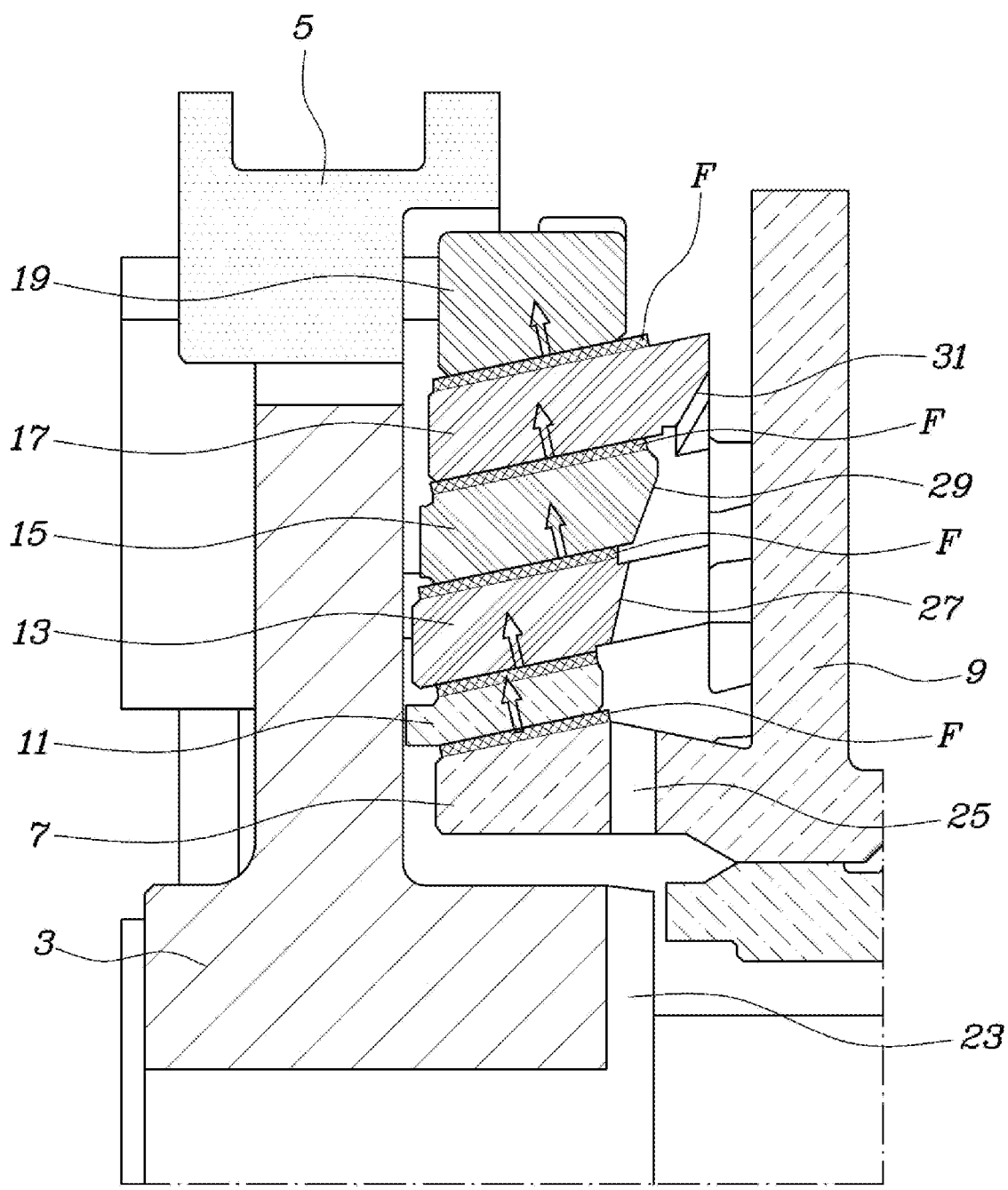
Figure 11:
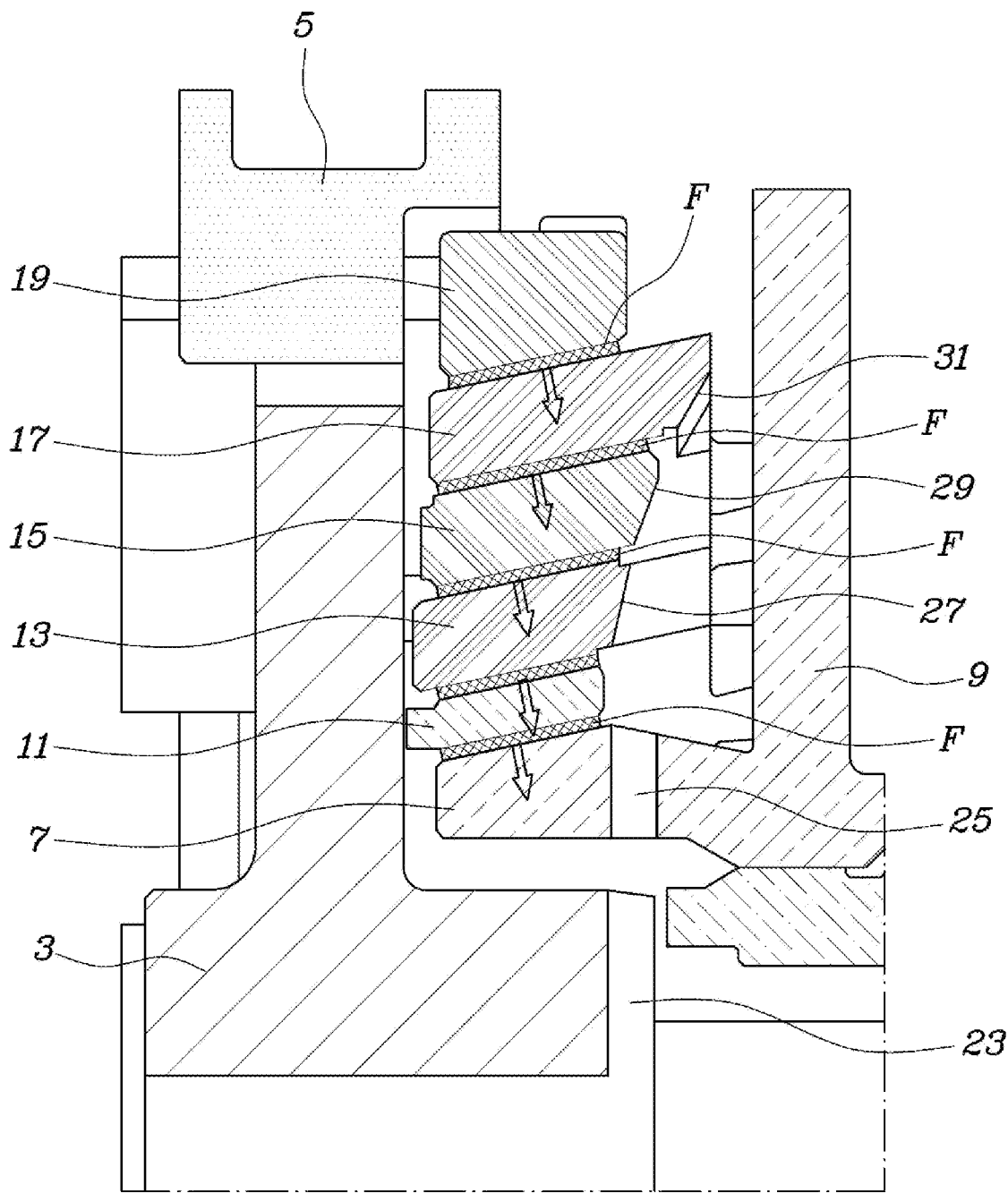

The clutch cone 7 includes the friction member F in an exemplary embodiment of FIG. 10, but does not include the friction member F in the other embodiments, and includes the friction member F in an exemplary embodiment of FIG. 11, but does not include the friction member F in the other embodiments, such that the clutch cone 7 and the third friction ring 19 may include the friction member F or may not include the friction member F, but the first friction ring 11, the internal middle cone 13, the second friction ring 15, and the external middle cone 17 forming the friction portions between the clutch cone 7 and the third friction ring 19 always include at least one friction member F.

Figure 6:
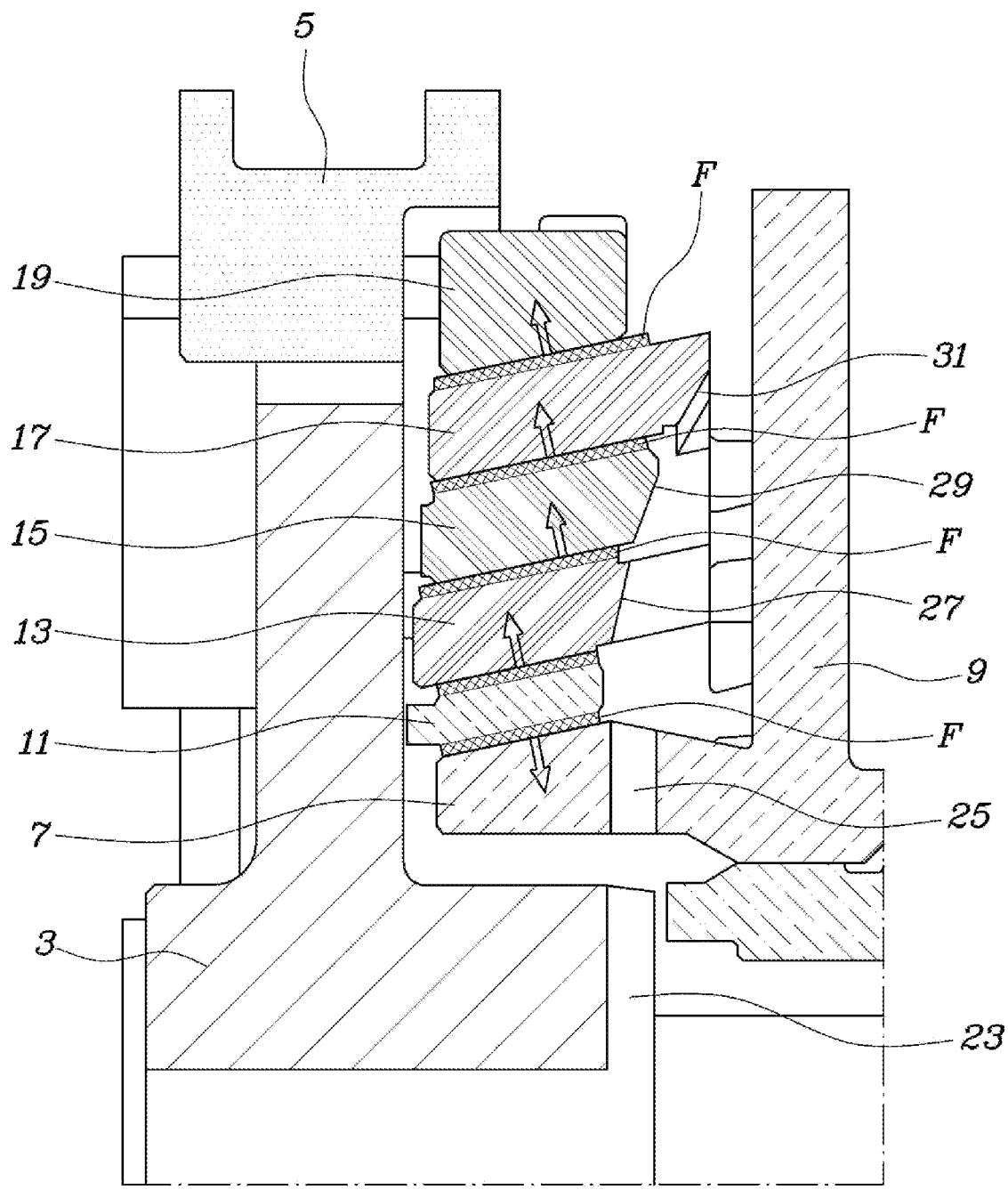
FIG. 6 is a view exemplarily illustrating various exemplary embodiments for a state in which a friction member is provided in the cone clutch for a vehicle according to an exemplary embodiment of the present invention.

In an exemplary embodiment of FIG. 6, the first friction ring 11 is a component including the friction members F provided on both of an internal contact surface and an external contact surface thereof.

Therefore, the friction member F is not provided on the clutch cone 7 adjacent to the first friction ring 11, the friction member F is provided on an external contact surface of the internal middle cone 13, the friction member F is also provided on an external contact surface of the second friction ring 15, and the friction member F is also provided on an external contact surface of the external middle cone 17, but the friction member F is not provided on the third friction ring 19.

In an exemplary embodiment of the present invention, heat generated in the friction portions are discharged while moving along directions as illustrated by arrows in FIG. 6, such that a situation in which the heat is concentrated on and supplied to any one component from both sides does not occur, and the entire heat is discharged to the outside of the components. Therefore, a cooling action may be uniformly and continuously performed smoothly on all of the components forming the friction portions, such that durability of the cone clutch according to an exemplary embodiment of the present invention may be ultimately secured.

Figure 7:
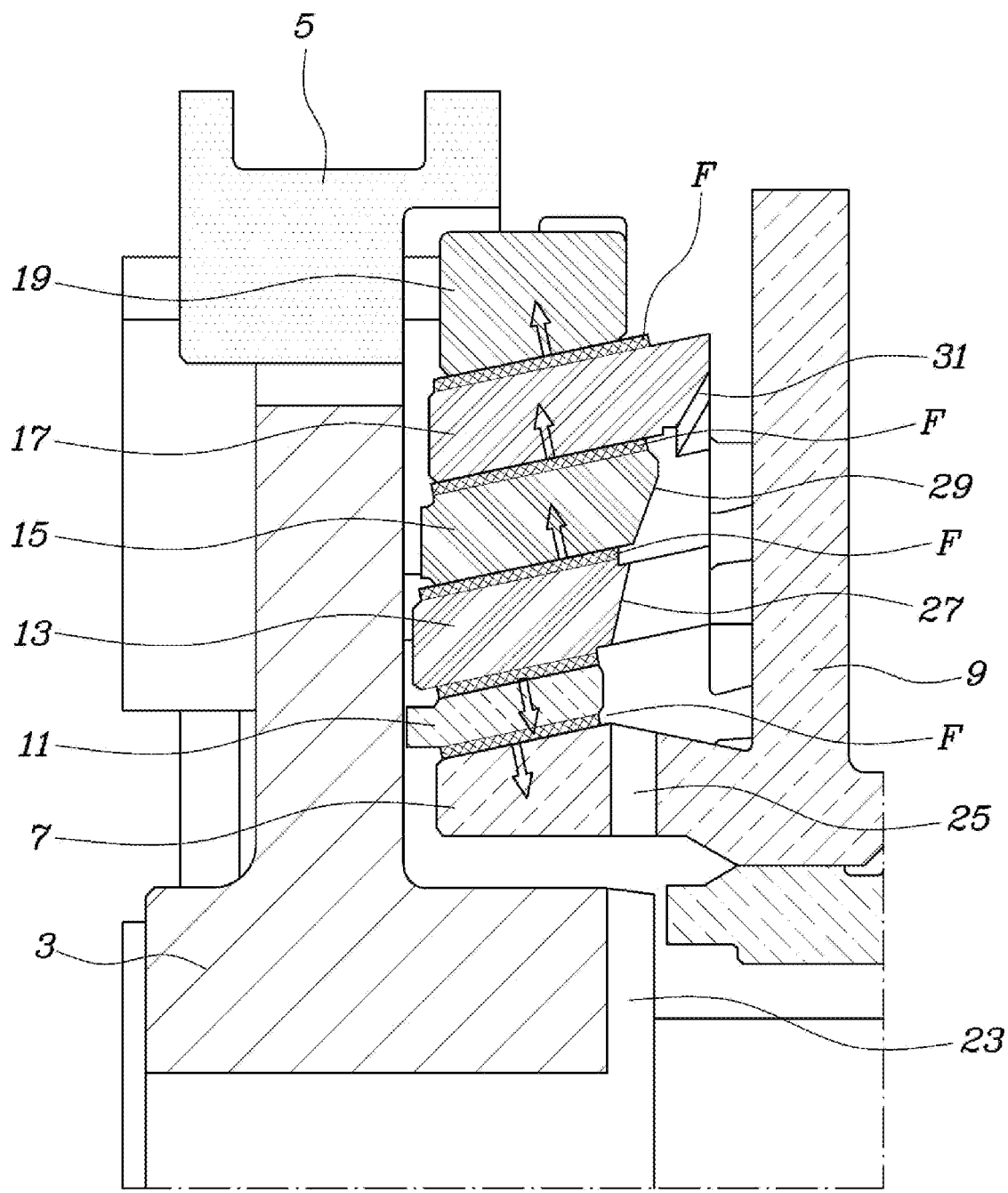
FIG. 7, FIG. 8, FIG. 9, FIG. 10, and FIG. 11 are views illustrating second to various exemplary embodiments for a state in which a friction member is provided in the cone clutch for a vehicle according to an exemplary embodiment of the present invention, respectively.

In an exemplary embodiment of FIG. 7, the internal middle cone 13 is a component including the friction members F provided on both of an internal contact surface and an external contact surface thereof.

Therefore, the friction member F is provided on an internal contact surface of the first friction ring 11 adjacent to an internal side of the internal middle cone 13, the friction member F is provided on an external contact surface of the second friction ring 15 adjacent to an external side of the internal middle cone 13, and the friction member F is also provided on an external contact surface of the external middle cone 17 adjacent to the second friction ring 15, but the friction member F is not provided on the third friction ring 19 and the clutch cone 7.

Also in the exemplary embodiment of the present invention, heat generated in the friction portions is discharged while moving along directions as illustrated by arrows in FIG. 7. Therefore, a situation in which the heat is concentrated on and supplied to any one component from both sides does not occur, and the entire heat is discharged to the outside of the components. Therefore, a smooth cooling action may be continuously secured, such that durability may be secured.

Figure 8:
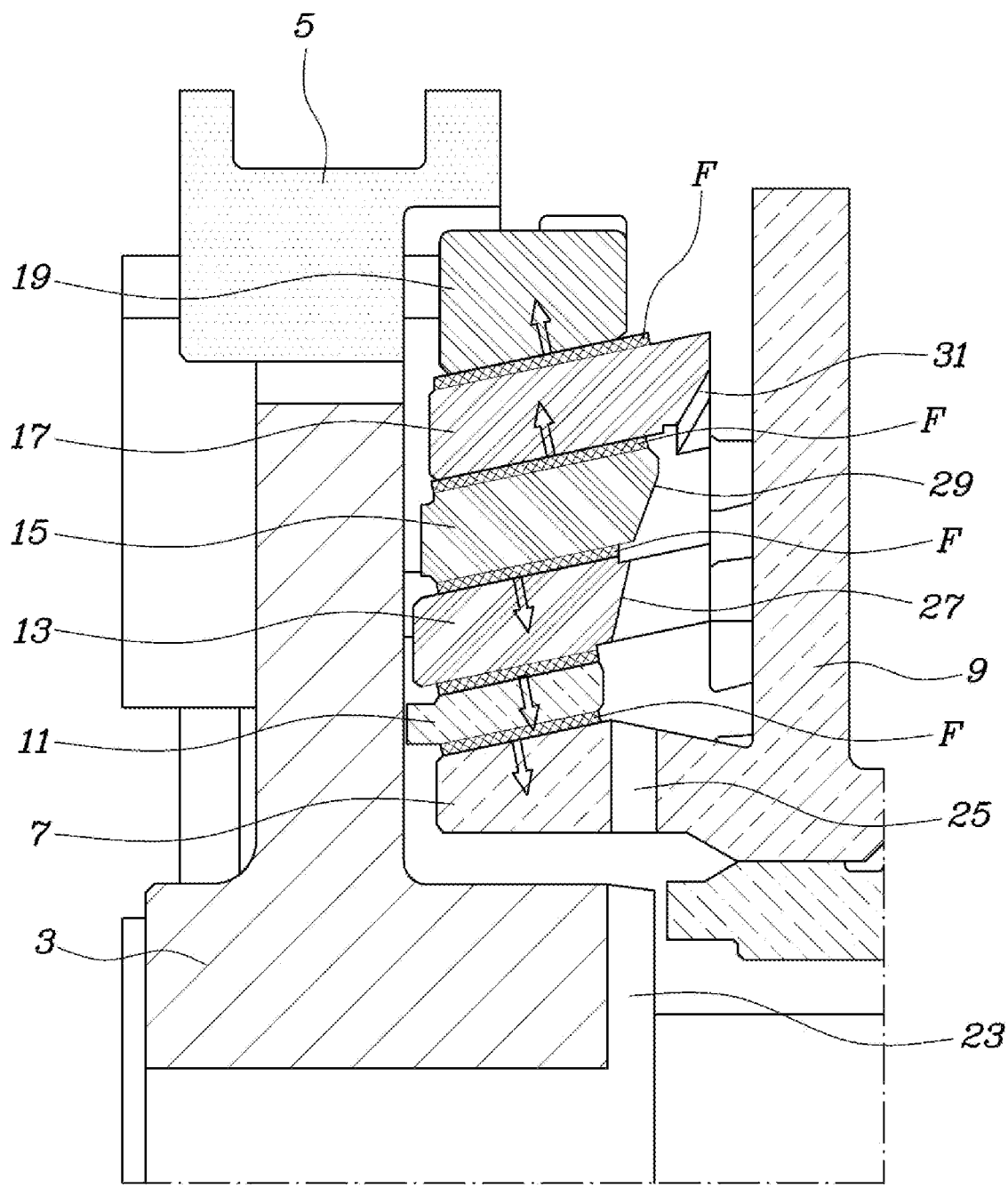

In an exemplary embodiment of FIG. 8, the second friction ring 15 is a component including the friction members F provided on both of an internal contact surface and an external contact surface thereof.

Therefore, the friction member F is provided on an internal contact surface of the internal middle cone 13 adjacent to an internal side of the second friction ring 15, the friction member F is provided on an internal contact surface of the first friction ring 13 adjacent to an internal side of the internal middle cone 13, and the friction member F is provided on an external contact surface of the external middle cone 17 adjacent to an external side of the second friction ring 15, but the friction member F is not provided on the third friction ring 19 and the clutch cone 7.

Also in the exemplary embodiment of the present invention, heat generated in the friction portions is discharged while moving along directions as illustrated by arrows in FIG. 8. Therefore, a situation in which the heat is concentrated on and supplied to any one component from both sides does not occur, and the entire heat is discharged to the outside of the components. Therefore, a smooth cooling action may be continuously secured, such that durability may be secured.

Figure 9:
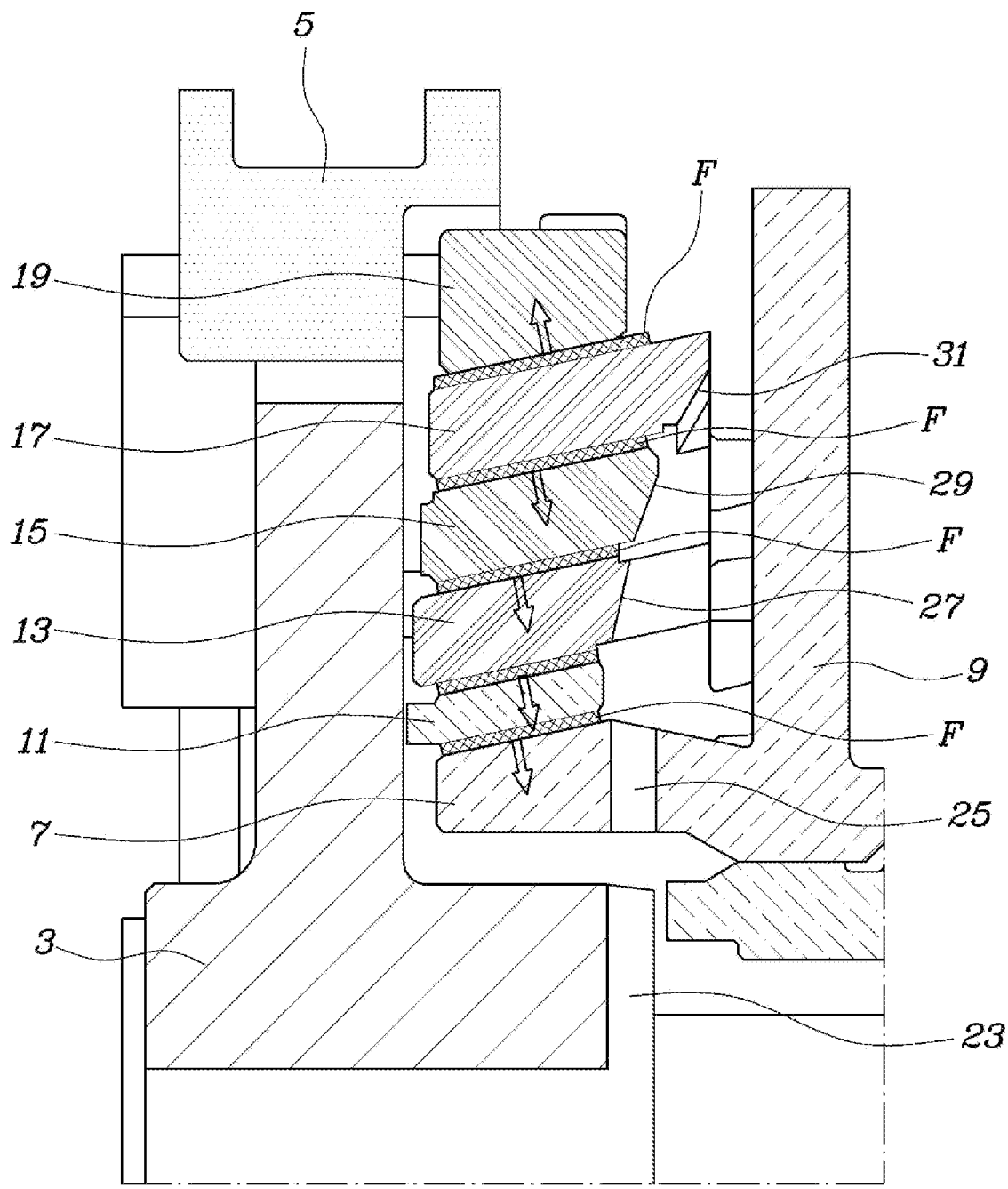

In an exemplary embodiment of FIG. 9, the external middle cone 17 is a component including the friction members F provided on both of an internal contact surface and an external contact surface thereof.

Therefore, the friction member F is provided on an internal contact surface of the second friction ring 15 adjacent to an internal side of the external middle cone 17, the friction member F is provided on an internal contact surface of the internal middle cone 13 adjacent to an internal side of the second friction ring 15, and the friction member F is provided on an internal contact surface of the first friction ring 11 adjacent to an internal side of the internal middle cone 13, but the friction member F is not provided on the third friction ring 19 and the clutch cone 7.

Also in the exemplary embodiment of the present invention, heat generated in the friction portions is discharged while moving along directions as illustrated by arrows in FIG. 9. Therefore, a situation in which the heat is concentrated on and supplied to any one component from both sides does not occur, and the entire heat is discharged to the outside of the components. Therefore, a smooth cooling action may be continuously secured, such that durability may be secured.

In an exemplary embodiment of FIG. 10, the friction member F is provided on an external contact surface of the clutch cone 7.

Therefore, the friction member F is provided on an external contact surface of the first friction ring 11 adjacent to an external side of the clutch cone 7, the friction member F is provided on an external contact surface of the internal middle cone 13 adjacent to an external side of the first friction ring 11, the friction member F is provided on an external contact surface of the second friction ring 15 adjacent to an external side of the internal middle cone 13, and the friction member F is provided on an external contact surface of the external middle cone 17 adjacent to an external side of the second friction ring 15, but the friction member F is not provided on the third friction ring 19.

Also in the exemplary embodiment of the present invention, heat generated in the friction portions is discharged while moving along directions as illustrated by arrows in FIG. 10, such that a situation in which the heat is concentrated on and supplied to any one component from both sides does not occur, and the entire heat is discharged to the outside of the components. Therefore, a smooth cooling action may be continuously secured, such that durability may be secured.

In an exemplary embodiment of FIG. 11, the friction member F is provided on an internal contact surface of the third contact ring 19.

Therefore, the friction member F is provided on an internal contact surface of the external middle cone 17 adjacent to an internal side of the third friction ring 19, the friction member F is provided on an internal contact surface of the second friction ring 15 adjacent to an internal side of the external middle cone 17, the friction member F is provided on an internal contact surface of the internal middle cone 13 adjacent to an internal side of the second friction ring 15, and the friction member F is provided on an internal contact surface of the first friction ring 11 adjacent to an internal side of the internal middle cone 13, but the friction member F is not provided on the clutch cone 7.

Also in the exemplary embodiment of the present invention, heat generated in the friction portions is discharged while moving along directions as illustrated by arrows in FIG. 11, such that a situation in which the heat is concentrated on and supplied to any one component from both sides does not occur, and the entire heat is discharged to the outside of the components. Therefore, a smooth cooling action may be continuously secured, such that durability may be secured.

The cone clutch for a vehicle may implement a relatively large torque transfer capacity while having a simple and compact configuration and occupying a relatively small volume, may reduce drags by allowing a frictional force not to be generated on friction surfaces as much as possible in a release state in which power is not transferred, and may improve durability and ultimately contribute to improvement of fuel efficiency by allowing components contributing to formation of the frictional force to be effectively cooled.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cone clutch apparatus for a vehicle, the cone clutch comprising:
 a hub mounted so that movement of the hub in an axial direction of the hub and a rotation of the hub are restricted to a shaft;
 a sleeve mounted to the hub so that a rotation of the sleeve is restricted to an external side of the hub and movement of the sleeve in the axial direction is allowed;
 a clutch ring mounted so that movement of the clutch ring in the axial direction is restricted and a rotation of the clutch ring is allowed with respect to the shaft and integrally including a clutch cone protruding toward the hub and having an external diameter that is reducing;
 a first friction ring mounted between the clutch ring and the hub, mounted so that a rotation of the first friction ring is restricted with respect to the hub, and pressed toward the clutch ring along the axial direction to allow a frictional force to be applied between the first friction ring and the clutch cone;
 an internal middle cone mounted so that a rotation of the internal middle cone is restricted with respect to the clutch ring and having an internal side surface in contact with an external side surface of the first friction ring;
 a second friction ring mounted so that a rotation of the second friction ring is restricted with respect to the hub and having an internal side surface in contact with an external side surface of the internal middle cone;
 an external middle cone mounted so that a rotation of the external middle cone is restricted with respect to the clutch ring and having an internal side surface in contact with an external side surface of the second friction ring; and
 a third friction ring mounted so that a rotation of the third friction ring is restricted with respect to the hub and having an internal side surface in contact with an external side surface of the external middle cone when the third friction ring is pressed by the sleeve, wherein friction members are mounted on one of two contact surfaces between the clutch cone and the first friction ring, between the first friction ring and the internal middle cone, between the internal middle cone and the second friction ring, between the second friction ring and the external middle cone, and between the external middle cone and the third friction ring, wherein a hub passage is formed in the hub so that oil transferred through an internal portion of the shaft passes along a radial direction of the hub through the hub passage, wherein a clutch passage is formed in the clutch ring so that the oil supplied through the hub passages is supplied along a radial direction of the clutch ring, wherein a first inclined surface to be pressed toward the hub by the oil supplied from the clutch ring passage is formed on a side portion of the internal middle cone, wherein a second inclined surface to be pressed toward the hub by the oil passing through the first inclined surface is formed on a side portion of the second friction ring, wherein a third inclined surface to be pressed toward the hub by the oil passing through the second inclined surface is formed on a side portion of the external middle cone, and wherein the second inclined surface of the second friction ring is formed so that an angle formed by the second inclined surface with respect to the shaft is smaller than an angle formed by the first inclined surface of the internal middle cone with respect to the shaft.

2. The cone clutch apparatus for the vehicle of claim 1, wherein the friction members are mounted on at least one of an internal contact surface or an external contact surface of each of the first friction ring, the internal middle cone, the second friction ring, and the external middle cone.

3. The cone clutch apparatus for the vehicle of claim 2, wherein the first friction ring includes friction members mounted on an internal contact surface and an external contact surface of the first friction ring among the friction members.

4. The cone clutch apparatus for the vehicle of claim 2, wherein the internal middle cone includes friction members mounted on an internal contact surface and an external contact surface of the internal middle cone among the friction members.

5. The cone clutch apparatus for the vehicle of claim 2, wherein the second friction ring includes friction members mounted on an internal contact surface and an external contact surface of the second friction ring among the friction members.

6. The cone clutch apparatus for the vehicle of claim 2, wherein the external middle cone includes friction members mounted on an internal contact surface and an external contact surface of the external middle cone among the friction members.

7. The cone clutch apparatus for the vehicle of claim 2, wherein one of the friction members is mounted on an external contact surface of the clutch cone.

8. The cone clutch apparatus for the vehicle of claim 2, wherein one of the friction members is mounted on an internal contact surface of the third friction ring.

9. The cone clutch apparatus for the vehicle of claim 1, wherein the third inclined surface of the external middle cone is formed so that an angle formed by the third inclined surface with respect to the shaft is smaller than the angle formed by the second inclined surface of the second friction ring with respect to the shaft.

\* \* \* \* \*